United States Patent
Rossner et al.

(10) Patent No.: US 7,874,686 B2
(45) Date of Patent: Jan. 25, 2011

(54) REFLECTIVE MARKER AND METHOD FOR ITS MANUFACTURE

(75) Inventors: Holger-Claus Rossner, Feldkirchen (DE); Thomas Pittroff, Markt Schwaben (DE)

(73) Assignee: BrainLAB AG, Feldkirchen (DE)

( * ) Notice: Subject to any disclaimer, the term of this patent is extended or adjusted under 35 U.S.C. 154(b) by 336 days.

(21) Appl. No.: 11/236,209

(22) Filed: Sep. 27, 2005

(65) Prior Publication Data

US 2006/0073307 A1    Apr. 6, 2006

Related U.S. Application Data

(60) Provisional application No. 60/616,987, filed on Oct. 8, 2004.

(30) Foreign Application Priority Data

Sep. 27, 2004    (EP)    .................................. 04022937

(51) Int. Cl.
*G02B 5/12* (2006.01)
(52) U.S. Cl. ........................ 359/515; 359/529; 359/530; 359/534; 359/900; 264/1.9; 428/403
(58) Field of Classification Search ......... 359/515–553, 359/831, 833–836, 900; 422/1–43; 264/1.6–1.9
See application file for complete search history.

(56) References Cited

U.S. PATENT DOCUMENTS

| | | | |
|---|---|---|---|
| 2,440,584 A | | 4/1948 | Heltzer et al. |
| 3,175,935 A | | 3/1965 | Vanstrum |
| 3,254,563 A | | 6/1966 | Vries et al. |
| 3,964,820 A | | 6/1976 | Eigenmann |
| 3,971,692 A | | 7/1976 | Anderson |
| 4,265,938 A | | 5/1981 | Jack et al. |
| 5,417,515 A | * | 5/1995 | Hachey et al. ................. 404/15 |
| 5,536,569 A | * | 7/1996 | Lasch et al. ................. 428/328 |
| 5,880,885 A | * | 3/1999 | Bailey et al. ................. 359/529 |
| 6,351,659 B1 | | 2/2002 | Vilsmeier |
| 2002/0068942 A1 | | 6/2002 | Neubauer et al. |
| 2004/0051948 A1 | * | 3/2004 | Reed .......................... 359/529 |

FOREIGN PATENT DOCUMENTS

| | | |
|---|---|---|
| FR | 2 706 045 | 12/1994 |
| GB | 1 531 480 | 11/1978 |
| WO | 2004/075768 | 9/2004 |

* cited by examiner

*Primary Examiner*—James Phan
(74) *Attorney, Agent, or Firm*—Renner, Otto, Boisselle & Sklar, LLP

(57) ABSTRACT

A reflective marker and method for manufacturing reflective marker, wherein the reflective marker includes an inner body and a reflective covering, and a reflective substance is applied to the inner body and forms the reflective covering together with pellets contained in the substance or applied after the substance has been applied.

30 Claims, 2 Drawing Sheets

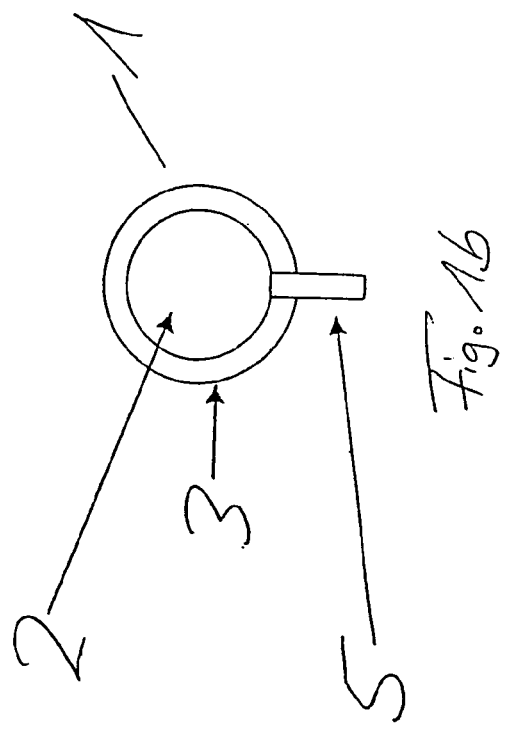
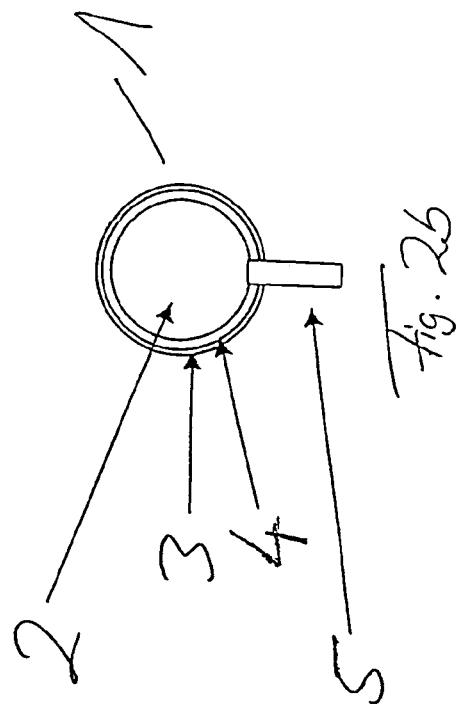
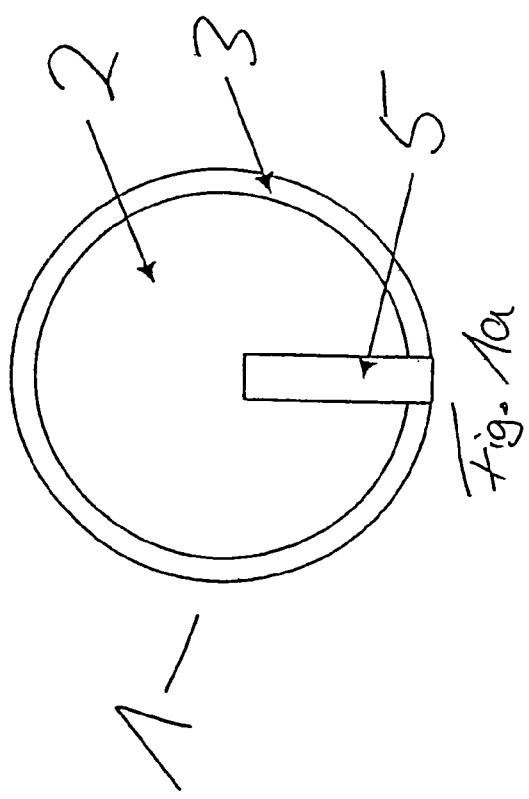
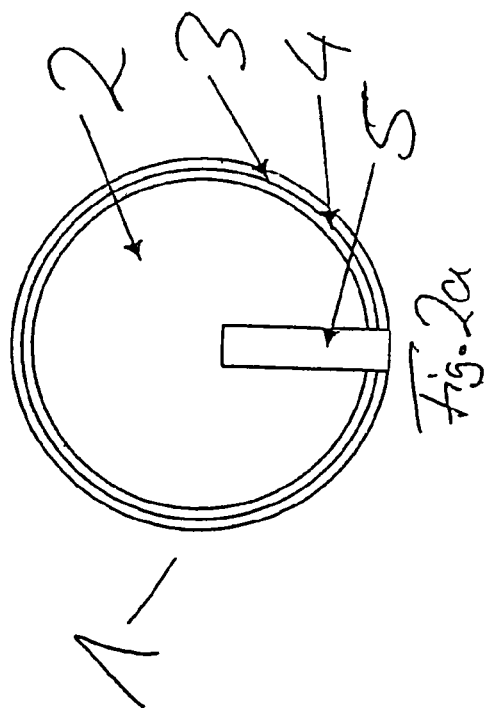

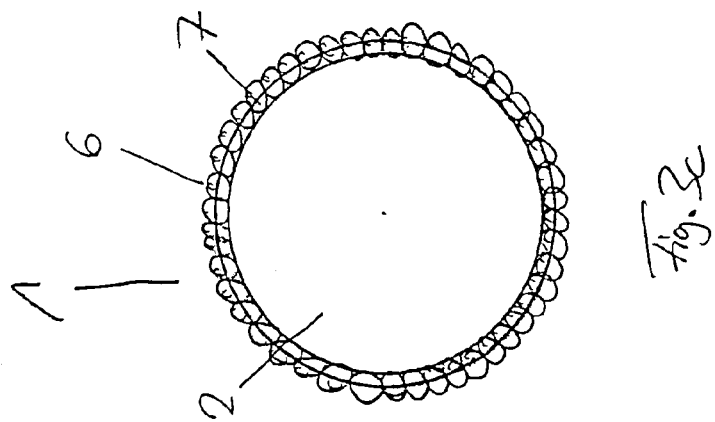
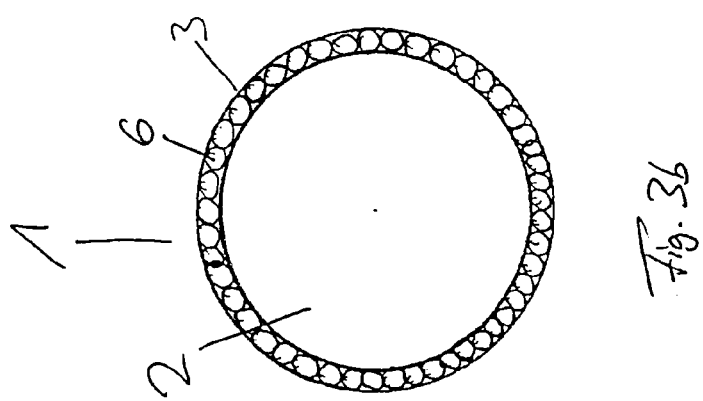
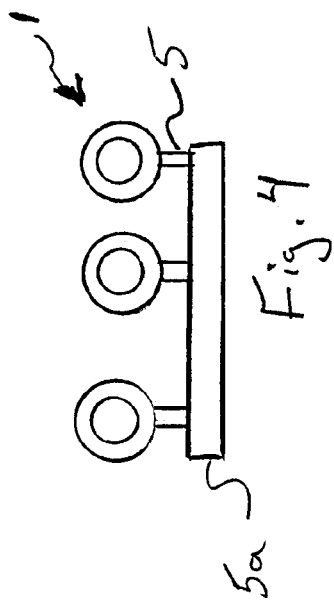
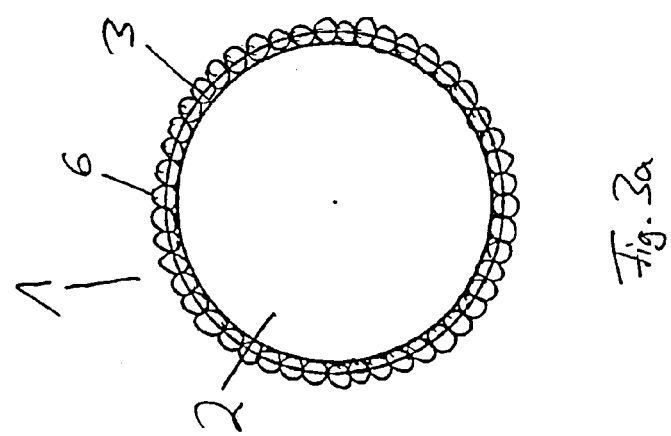

REFLECTIVE MARKER AND METHOD FOR ITS MANUFACTURE

RELATED APPLICATION DATA

This application claims priority of U.S. Provisional Application No. 60/616,987 filed on Oct. 8, 2004, which is incorporated herein by reference in its entirety.

FIELD OF THE INVENTION

The present invention relates to reflective markers and, more particularly, to a marker and method for manufacturing the same, wherein one or more such markers exhibit a three-dimensional shape, such as a spherical shape, and can be used in the field of medicine, e.g., in an operation and/or as an aid attached to the body of the patient for registering and navigating the body. The reflective or retro-reflective properties result from a special surface coating or surface structure that can be obtained by various methods, including spraying, coating, painting, lacquering or immersing methods.

BACKGROUND OF THE INVENTION

In order to exhibit optimum reflective or retro-reflective properties, the surface of a marker should have a uniform structure. Hence, preferable manufacturing methods are those wherein finished markers exhibit the same reflective or retro-reflective properties at every point of their surface.

U.S. Pat. No. 3,964,820 describes a retro-reflecting element of generally globular configuration adapted to retro-reflect a ray of light back along its own incident path, when impinged by grazing light on a part-spherical portion of its surface, bulging above the surface of a support layer wherein such element is partially embedded. The element includes an essentially optically homogeneous body forming the part-spherical portion and provided, on its remaining surface, with a plurality of closely spaced inwardly concave and reflective part-spherical small bowls capable of sending back, by multiple reflections totaling 180 degrees, light rays impinging on the bulging part-spherical portion and refracted therethrough within said body towards any of the bowls.

U.S. Pat. No. 3,971,692 relates to a retro-reflective material that is manufactured by applying a layer of transparent glass spheres onto an adhesive covering formed on a substrate sheet, wherein the exposed portions of the spheres are coated with a reflective material such as aluminum, and the coated portions of the spheres are embedded in an adhesive coating of a component, wherein the substrate film is then removed.

U.S. Pat. No. 4,265,938 relates to retro-reflectors such as those used for road signs and vehicle number plates. Here, the surface of a metallic substrate is made retro-reflective by adhering a layer made of an organic polymer and glass spheres, and then guiding the substrate through a roller, wherein the glass spheres are covered with a crucible, such that the spheres create recesses in the metallic surface.

SUMMARY OF THE INVENTION

A method for manufacturing reflective or retro-reflective markers having an inner body, base body or three-dimensional body (hereinafter referred to as a body or inner body) and a reflective covering applied to the body is disclosed. When manufacturing the markers, a liquid reflective substance or substrate substance can be applied, preferably directly to the inner body, which preferably is made of a transparent or non-transparent material, such as plastic or the like. The liquid reflective substance can contain a granular or granulated material (e.g., granulate and/or pellets, which can be made of a transparent material, such as glass or the like) and/or a reflective material, such as aluminum powder, silver powder, gold powder or the like. In particular, the granulate, pellets and/or reflective material can be contained in or mixed with a liquid substance such as a lacquer, for example.

As used herein, a liquid substance is not necessarily understood as a substance in a liquid state of aggregation. More particularly, a liquid substance can be in a liquid phase, a mixture of substances, a mixture of phases, or a dispersion, such that in the mixture of the at least two substances or materials, the materials can dissolve into each other, cannot dissolve into each other, can partially dissolve into each other, or can partially combine chemically with each other. For example, a solid, liquid and/or gaseous phase or a substance (e.g., a dispersed phase) can be dispersed, contained, or dissolved in a solid, liquid or gaseous phase or substance, for example as a dispersant, wherein a solid, liquid and/or gaseous phase can be contained or dispersed in a liquid or gaseous phase. Thus, gelatinous or foam-like substances as well as suspensions, emulsions or solutions can be understood as a liquid substance. In particular, all substances that are suitable for application to the inner body with or without the pellets are designated as a liquid substance, such that pellets contained in the substance or applied after the substance has been applied to the body can be immersed in the substance to about 50%, and/or are embedded in the substance and together with the substance form a reflective and/or retro-reflective covering.

The inner body can be completely filled, e.g., solid, but also can be produced with a cavity, or a cavity can be created in the inner body after it has been manufactured. Furthermore, a fixing device can be provided on the inner body, such as a hole, notch, rod or the like, which can be used to fix or otherwise attach the marker to a support so as enable the formation of a marker array (e.g., a reference star having a number of markers attached to the support). The fixing device attached to the inner body can be protected during the manufacturing process so as to ensure that the finished marker can be securely attached at a later time.

Before being applied to the inner body, the liquid reflective substance can be mixed with or from a granular or granulated material (e.g., granulate, such as plastic grains or components, pellets) and/or reflective material such as reflective powder (e.g., aluminum, silver, gold powder or the like). The liquid reflective substance can be formed by mixing a liquid substance, such as a lacquer, with the granulate, pellets and/or reflective material or powder, for example. The liquid reflective substance also can be a reflective adhesive. In particular, the liquid reflective substance can exhibit its reflective properties when it is at least partially or completely dry, and need not possess reflective properties in its liquid state, irrespective of which of the cited components the liquid reflective substance or substrate substance is mixed with or made of. Pellets made of a transparent material such as glass and/or having a diameter between 10 and 250 micrometers (μm), or between about 100 and 200 um, preferably 180 μm, can be used as elements in the coating substance.

The liquid reflective substance can be applied to the inner body in various ways. For example, the liquid reflective substance containing, for example, the granular or granulated material (e.g., granulate, pellets) and/or reflective material or powder can be sprayed onto the inner body, wherein the pellets (e.g., pellets, beads and/or small spheres formed from glass) can be mixed with the granulated material to form the liquid reflective substance or substrate substance, or can be applied after the liquid reflective substance or substrate substance has been applied. When dry, the liquid reflective substance forms a reflective or retro-reflective covering or outer body around or on the inner body. In addition, the liquid reflective substance also could be mixed with reflective or highly reflective components, such as aluminum, silver, gold powder or the like, in order to form a reflective or retro-reflective covering when dry, together with the other components of the liquid reflective substance (e.g., the granular or granulated material and/or the pellets), wherein the components of the liquid reflective substance (e.g., the granulated material, the pellets and/or the highly reflective components) are uniformly mixed and, when dry, form a covering uniformly applied to the inner body and in which the pellets, which can exhibit a diameter between 10 and 250 µm, are at least partially, in particular about half-way, embedded in the reflective substance. The pellets preferably have a diameter of about 180 µm. Irrespective of which of the components are contained in the liquid reflective substance, they can be applied uniformly to the inner body using a spraying method, for example. By way of example, the coating may have a thickness of one half the radial dimension (diameter) of the pellet.

The inner body also can be coated, painted or lacquered with the liquid reflective substance, wherein the pellets can be contained in the liquid reflective substance, e.g., can be applied during the spraying or lacquering method. Alternatively, the pellets can be applied after the liquid reflecting substance is applied (while the liquid is wet or only partially dry) using a spraying or firing method, for example. In this example, the liquid reflecting substance would include the granular or granulated material and/or the highly reflective components.

Furthermore, the liquid reflective substance can be applied to the inner body by immersing the inner body in an immersion bath that includes the liquid reflective substance. The liquid reflective substance can be an adhesive that may be used to apply the pellets. Preferably, the adhesive is applied using a spraying or firing method, such as a powder spraying method, such that when the covering is liquid or partially dried and when the outer covering is dry, the pellets are at least partially, in particular about half-way, embedded in the outer covering.

The outer covering also can be applied to the inner body by applying a liquid reflective substance with adhesive properties, such as a reflective adhesive, to the inner body and electrostatically charging the inner body. The pellets then can be electrostatically charged opposite to the inner body. For example, the liquid reflective substance can be applied to the electrostatically charged inner body, and the pellets, which are electrostatically charged opposite to the inner body, are attracted by the inner body, in particular when the charged pellets are brought close to the oppositely charged inner body, and are affixed or adhered to the inner body via the adhesive. Due to the adhesive properties of the substance, the pellets remain affixed to the covering and can be at least partially, in particular about half-way, embedded in the adhesive, such that in combination with the reflective adhesive substance or the reflective adhesive, the pellets exhibit reflective or retro-reflective properties.

Furthermore, the inner body and, therefore, the entire marker also can be made of the liquid reflective substance, which can include the granular or granulated material and the highly reflective components, wherein the pellets can be applied to the inner body or marker, for example, when the substance is partially dried.

Irrespective of which approach is used to manufacture the reflective or retro-reflective marker, the components of the liquid reflective substance from which the reflective covering can be formed, such as the granular or granulated material (e.g., granulate and/or pellets), the highly reflective components and/or the reflective adhesive, can be uniformly mixed. The components should then form an at least approximately homogenous mixture, wherein it is not required for the components to necessarily have equal proportions in the mixture. In particular, the liquid reflective substance can be uniformly applied to the inner body such that when dried, the substance forms a reflective or retro-reflective covering or outer body, with a constant or uniform thickness, radially around the inner body.

As opposed to known methods, the methods in accordance with the invention can be used to manufacture markers that exhibit approximately the same reflective or retro-reflective properties at every point. The known methods either cannot be used to manufacture three-dimensional markers or cannot apply a uniformly reflective or retro-reflective surface, since discontinuities such as joints can arise, for example, when applying the reflective film.

The inner body and the marker formed therefrom can be manufactured in various shapes, e.g., spherical, cylindrical, pyramidal or prismatic. Spherical markers can have a diameter between 5 and 50 millimeters (mm), preferably about 13.2 mm with a tolerance of ±0.04 mm. However, the present invention is not restricted to the cited sizes and, for example, can be used to manufacture large areas or markers, in particular large reflective areas or markers.

The pellets, which, for example, can be contained within the liquid reflective substance or can be applied over the liquid reflective substance, preferably are cleaned, in particular burnished or chemically treated, on their outer surface. For example, the pellets can be cleaned by removing or etching away excess material of the liquid reflective substance from the outer surface of the pellets, in particular from the surface of the pellets pointing outwards or away from the inner body, such that the covering (including a layer of dried reflective substance in combination with the pellets embedded at least partially in the layer) exhibits reflective, in particular retro-reflective, properties. The substrate substance or liquid reflective substance also can be reduced on the outer surface of the pellets using a drying process, or can reduce itself during the drying process, such that after the drying process, for example, the pellets lie about half-way in the substrate substance and the marker exhibits reflective properties. These reflective properties result from the reflective properties of the covering or the reflective layer in combination with the light-refractive properties of the pellets, which is in part a factor of the refraction index of the pellets.

The markers can be sterilized to obtain a disinfected marker. Preferably, an ethylene gas or the like is used to sterilize the markers such that, for example, the markers have at most 10 germs per marker.

The markers or their components (e.g., the reflective materials) can be configured such that the reflective properties are lost through a further sterilization method, such as, for example, steam sterilization. This can ensure that only new or "fresh" markers are used, and can be regarded as a sort of sterility and/or quality assurance method. If the reflective or retro-reflective properties were not lost, the markers could be used any number of times such that the high demands on the sterility of the markers could not be met. If the markers lose their reflective or retro-reflective properties after being re-sterilized, then they can no longer be used for registering and/or navigating a body. This ensures that new markers, tested for example by the manufacturer for sterility, are always used that satisfy the high sterility demands.

In accordance with another aspect of the invention, the reflective markers also can be manufactured using a method in which the pellets are completely or at least partially coated with a reflective substance (e.g., a liquid). The pellets can be applied to the inner body, for example, by means of one of the previously described methods, and the coating of the pellets can be removed, in particular etched away, abraded, ground down or washed off, at least at one point on the outer surface of the pellets. Preferably, the coating can be removed on the side of the pellets pointing away from the inner body or on the side of the pellets not connected to the inner body. An adhesive also can be applied to the inner body, preferably uniformly, before the pellets are applied, such that the adhesive forms an adhesive layer in which the pellets are at least partially introduced or embedded in the adhesive, e.g., about 50%. The adhesive can be reflective or non-reflective. The previously described features or steps for manufacturing reflective markers can be used in such a manufacturing method. Thus, for example, a reflective adhesive can be used that can be applied directly to the inner body or the inner body can be made from a non-transparent material. A cavity also can be created in the inner body or the inner body can be produced with a cavity. Pellets made of a transparent material can be used or the adhesive can be applied by means of a spraying, coating, painting or lacquering method or by means of an immersion bath.

The markers can include an inner body and an outer covering or outer body, applied preferably directly to the inner body on an outer surface of the inner body. The outer covering can include a reflective substance having pellets that are at least partially, preferably about half-way, embedded in the outer covering. The pellets preferably are formed from a transparent material, such as glass or the like. This arrangement leads to uniform reflective or retro-reflective properties in the markers, resulting from the refraction index of the pellets in combination with the reflective properties of the substance or material in which the pellets are at least partially embedded. Light beams incident to the marker can be refracted by the surface of the pellets, penetrate the preferably transparent pellets, hit the surface of the reflective covering and reflect off of the covering. After penetrating the pellets, the light beam can be refracted by the surface of the pellets such that the light beam can be emitted in a similar direction to that from which it was incident. Consequently, the light beam can be at least approximately reflected onto its emitter, whereby the marker possesses reflective or retro-reflective properties.

In accordance with another aspect of the invention, the reflective marker includes an inner body and an adhesive layer that can be applied, preferably uniformly, around the inner body, and pellets introduced in the adhesive layer that can be or have been at least partially coated with a reflective substance. The portion of the surface of the pellets pointing towards the inner body can be coated with the reflective substance, and the portion of the outer surface of the pellets pointing away from the inner body or outwards can be free of the reflective substance.

In particular, the inner body of the reflective marker can include a transparent or non-transparent material such as plastic or the like, such that incident light beams, for example, that can be refracted by the surface of the pellets and hit the reflective substance or the inner body do not reach the interior of the inner body but are reflected or absorbed by it. Equally, the inner body of the marker also can include the reflective substance itself (e.g., the granular or granulated material such as granulate) and the highly reflective components (e.g., aluminum, silver, gold powder or the like) such that the entire marker can be completely formed from this substance, and when the substance is partially dried, pellets can be attached to the outer surface. The inner body also can exhibit a cavity (e.g., a hole, notch or rod) and a fixing device can be attached to the cavity. The fixing device can be used to fix the marker to a holding element, such as a reference star, for example.

The reflective substance used to form the outer covering or the inner body preferably includes a granular, granulated material and/or pellets, preferably made of a transparent material, and/or a reflective material such as aluminum, silver, gold powder or the like. This substance can be applied to the inner body such that it forms an outer covering or outer body around the inner body, in which the pellets are at least partially embedded. In order to ensure the best possible reflective properties for the marker, the pellets, which preferably have a diameter between 10 and 250 µm, in particular 180 µm, should be embedded half-way in the outer covering, such that light beams hitting the pellets are refracted into the interior of the pellets and are reflected by the reflective covering. The pellets are preferably arranged directly adjacent to each other, such that light beams radiated onto the marker preferably hit the pellets. The outer covering or outer body also can be uniformly applied to the inner body and can form a covering or outer body having a uniform thickness to ensure the same reflective or retro-reflective behavior at every point on the marker.

The reflective marker can have various shapes, e.g., it can be spherical, cylindrical, pyramidal or prismatic. If the marker is a sphere or formed spherically, it preferably has a diameter between 5 and 50 mm, in particular about 13.2 mm, wherein deviations of a few hundredths of a millimeter, such as about 0.04 mm, can occur, and weighs less than 2 grams, for example.

The forgoing and other embodiments of the invention are hereinafter discussed with reference to the drawings.

BRIEF DESCRIPTION OF THE DRAWINGS

FIGS. 1A and 1B illustrate a first embodiment of a reflective marker in accordance with the invention, wherein the retro-reflective covering includes a mixture of granular or granulated material, pellets and highly reflective powder.

FIGS. 2A and 2B illustrate another embodiment of a reflective marker in accordance with the invention, wherein the retro-reflective layer includes a mixture of granular or granulated material, pellets and adhesive.

FIG. 3A illustrates yet another embodiment of a reflective marker in accordance with the invention, including a reflective covering and pellets embedded in the reflective covering.

FIG. 3B illustrates another embodiment of the reflective marker in accordance with the invention, including pellets and a reflective substance applied to the pellets.

FIG. 3C illustrates yet another embodiment of a reflective marker in accordance with the invention, including an adhesive layer and partially metallized pellets introduced into the adhesive layer.

FIG. 4 illustrates a reference star that includes a plurality of markers as shown in FIG. 1b attached to a schematic representation of a support.

DETAILED DESCRIPTION

FIG. 1A shows a cross-section of an exemplary spherical reflective or retro-reflective marker 1, of which an inner body 2 includes plastic material or the like, to which a covering 3 having reflective or retro-reflective properties is directly applied. The reflective covering 3 includes a mixture of a granular or granulated material (e.g., plastic granulate and/or pellets such as glass pellets) and/or reflective powder such as aluminum, silver, gold powder or the like. The covering 3 is not initially applied to the inner body 2 but is mixed, while liquid, from at least one of the components (e.g., the granulate, the pellets and/or the reflective powder) and sprayed, coated, painted or lacquered onto the inner body 2. Alternatively, the inner body 2 can be immersed in an immersion bath that includes the liquid substance, such that when dried, a preferably uniform covering 3 exhibiting reflective or retro-reflective properties is created on the inner body 2. The pellets can be contained in the liquid substance from the start and applied to the inner body 2 such that when the covering 3 is dried, the pellets are about half-way embedded in the covering (e.g., half of the pellet is in the covering and half the pellet is out of the covering), or, for example, they can be sprayed or fired on the inner body 2 after the covering 3 has been applied (e.g., when the layer or covering 3 is partially dried). For example, a powder spraying method or thermal coating method can be used to apply the pellets. A hole serving as a fixing device 5 is attached to the marker 1 and, for example, can be attached to the inner body 2 before the reflective covering 3 has been applied. The hole thereby remains protected while the reflective covering 3 is applied to the marker, such that the hole is accessible from outside the marker 1 and can be attached to a holding element such as a reference star, for example.

FIG. 1B shows the reflective marker 1 from FIG. 1A, wherein a rod is provided on the inner body 2 or on the marker 1 as the fixing device 5. The rod also can be protected while the reflective covering 3 is applied. Further, the rod can serve as a fixing device 5 for attaching the marker 1 to a reference star, for example.

FIG. 2A shows a cross-section of an exemplary spherical reflective or retro-reflective marker 1, wherein an outer covering 3 or outer body, preferably including granular or granulated material such as plastic granulate, pellets and/or an adhesive, and which can be reflective or non-reflective, is applied to the inner body 2. The covering 3 then can be applied to the inner body 2 by electrostatically charging the inner body 2 and coating or covering the inner body with a liquid adhesive 4. The liquid adhesive preferably possesses reflective properties when dried. The pellets then can be electrostatically charged opposite to the inner body 2 and brought close to the inner body 2, such that the pellets are attracted by the inner body 2 due to electrostatic forces. The pellets remain affixed or adhered to the adhesive 4, which, for example, can be partially dried, such that when the adhesive 4 is dried, the pellets are at least partially, preferably about half-way, embedded in the adhesive 4. The combination of the pellets, in particular their refraction properties, with the reflective adhesive surface 4 beneath the pellets effects highly reflective or retro-reflective properties in the covering 3 and, therefore, in the marker 1. A fixing device 5, such as a hole as in FIG. 2A or a rod as in FIG. 2B, also can be attached to the marker 1 or inner body 2, and is protected while the adhesive 4, pellets and/or the granulate is applied, such that the marker 1 can be fixed to a holding element such as a reference star.

A non-reflective adhesive 4 also can be applied to the inner body 2, wherein the pellets can be completely or at least partially coated with the liquid reflective substance, and the coated portions of the pellets are introduced into the adhesive 4 or the adhesive layer. The pellets, which are at least partially coated with the liquid reflective substance, can be introduced about half-way into the adhesive 4 using one of the described methods, such that the covering 3 (which includes at least partially coated pellets) applied to the adhesive 4 or affixed to the adhesive 4 exhibits reflective, in particular retro-reflective properties. Excess substance, such as substance pointing away from the inner body or not connected to the adhesive 4 affixed to the adhesive 4, can be removed from the pellets or surface of the pellets, for example, by etching.

FIG. 3A shows another embodiment of a reflective marker 1 in accordance with the invention, including a reflective covering 3, wherein pellets are at least partially (e.g., about 50%) immersed or embedded in the covering. Light beams hitting the reflective marker 1 are refracted by the surface of the pellets 6, reflected by the reflective covering 3 and refracted again by the pellets 6, such that the emitted light beam is reflected at least approximately in the same direction from which the incident light beam was incident to the reflective marker 1. The liquid reflective substance is preferably applied directly to the inner body 2 to produce the reflective marker 1. The pellets 6 then are sprayed or fired onto the liquid reflective substance, preferably when the reflective substance is liquid or partially dried, such that the pellets 6 together with the liquid reflective substance form a reflective covering 3, and are at least partially, advantageously about half-way, embedded in the reflective covering 3.

FIG. 3B shows another embodiment of a reflective marker 1 in accordance with the invention, including an inner body 2, wherein in order to manufacture the reflective marker 1, a reflective substance is sprayed, coated, painted or lacquered onto the inner body 2, or the inner body 2 is immersed in the reflective substance. The reflective substance can contain pellets 6, such that, for example, the reflective substance including the pellets 6 form a covering 3 when dried. The pellets 6 can be coated with the substance or surrounded by the substance, for example, when the reflective substance is at least partially dried. At least a portion of the pellets 6, preferably the portion of the surface of the pellets 6 pointing away from the inner body 2, can be freed of the substance by etching the substance away or by reducing or removing the substance using a drying process, for example.

FIG. 3C shows another embodiment of a reflective marker 1 including an inner body 2, wherein in order to manufacture the reflective marker 1, an adhesive, which can be reflective or non-reflective, is applied to the inner body 2 and, when at least partially dried, forms a preferably uniform adhesive layer 7 around the inner body 2. The pellets 6 preferably are at least partially metallized or coated with a reflective substance and introduced into the adhesive layer 7, such that about 50% of each pellet 6 is embedded in the adhesive layer 7 and about 50% of each pellet 6 is exposed. The pellets 6 subsequently can be freed of the metallization, for example, by means of an etching process or washing process, wherein the exposed portion of the pellets 6 is advantageously freed of the metallization.

FIG. 4 illustrates an exemplary reference star 8 that may be used in medical navigation. The reference star 8 includes a plurality of markers 1, such as the marker of FIG. 1b, for example. The markers 1, via the fixing device 5, are attached to a support 5a, which is schematically shown in FIG. 4.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for manufacturing reflective markers suitable for use in medical registration and medical navigation, said markers comprising an inner body and a reflective covering, the method comprising:
applying a reflective substance to the inner body;
applying pellets to the inner body, said pellets being applied together with the reflective substance or after application of the reflective substance, wherein the pellets and the reflective substance form the reflective covering, wherein the reflective covering is configured such that reflective properties of the marker are lost through a sterilization process.

2. The method as set forth in claim 1, wherein applying the pellets includes directly applying the pellets to the inner body.

3. The method as set forth in claim 1, further comprising creating a cavity in the inner body.

4. The method as set forth in claim 1, wherein applying the reflective substance includes mixing the reflective substance with or from at least one of a granulated material, pellets, or a reflective material prior to application of the reflective substance.

5. The method as set forth in claim 4, wherein the reflective material is selected from the group consisting of aluminum powder, silver powder and gold powder.

6. The method as set forth in claim 1, wherein applying pellets includes using pellets formed from transparent material.

7. The method as set forth in claim 6, wherein using pellets formed from transparent material includes using glass as the transparent material.

8. The method as set forth in claim 1, wherein applying pellets includes using reflective elements having a diameter between about 10 and 250 µm.

9. The method as set forth in claim 1, wherein applying the reflective substance includes spraying, coating, painting, lacquering or immersing the reflective substance on the inner body.

10. The method as set forth in claim 1, wherein applying the pellets includes spraying or firing the pellets on the reflective substance after application of the reflective substance.

11. The method as set forth in claim 10, wherein spraying includes powder spraying.

12. The method as set forth in claim 1, wherein applying the reflective substance includes forming an outer covering around the inner body, and the pellets are at least partially embedded in the outer covering.

13. The method as set forth in claim 12, wherein forming the outer covering includes embedding the pellets in the outer covering such that about 50% of the pellets are within the outer covering.

14. The method as set forth in claim 1, wherein markers are manufactured having a diameter between about 5 and 50 mm.

15. The method as set forth in claim 1, further comprising sterilizing the markers using ethylene gas.

16. A reflective medical navigation marker suitable for use in medical registration and medical navigation for tracking a spatial position of the marker, said marker comprising:
an inner body;
a reflective covering comprising a reflective substance on the inner body and pellets on the inner body in contact with the reflective substance, wherein the reflective covering is configured such that reflective properties of the marker are lost through a sterilization process.

17. The marker as set forth in claim 16, wherein the reflective substance and the pellets are provided directly on an outer surface of said inner body.

18. The marker as set forth in claim 16, wherein the reflective substance includes at least one of the materials selected from the group consisting of granulated material, pellets, reflective material, aluminum powder, silver powder and gold powder.

19. The marker as set forth in claim 16, wherein the reflective substance is applied to the inner body such that it forms an outer covering around the inner body, and the pellets are at least partially embedded in the outer covering.

20. The marker as set forth in claim 19, wherein said covering is applied to the inner body to form a covering having a substantially uniform thickness.

21. The marker as set forth in claim 16, wherein about one half of each pellet is embedded in the covering.

22. The marker as set forth in claim 16, wherein the pellets are formed from a transparent material.

23. The marker as set forth in claim 16, wherein the pellets are glass pellets.

24. The marker as set forth in claim 16, wherein the pellets have a diameter between about 10 and 250 µm.

25. The marker as set forth in claim 16, wherein the marker has a spherical, cylindrical, pyramidal or prismatic shape.

26. The marker as set forth in claim 16, wherein the marker has a diameter between 5 and 50 mm.

27. A reference star comprising:
a plurality of markers as set forth in claim 16; and
a support, wherein said plurality of markers are attached to the support to form an array of markers.

28. The marker as set forth in claim 16, wherein the fixing device does not include the reflective covering.

29. A reflective medical navigation marker suitable for use in medical registration and medical navigation for tracking a spatial position of the marker, said marker comprising:
an inner body;
a reflective substance on the inner body;
pellets in contact with the reflective substance, wherein the inner body includes a cavity, wherein the reflective substance is configured such that reflective properties of the marker are lost through a sterilization process.

30. A method for manufacturing reflective markers suitable for use in medical registration and medical navigation, said markers comprising an inner body and a reflective covering, the method comprising:
applying a reflective substance to the inner body;
applying pellets to the inner body, said pellets being applied together with the reflective substance or after application of the reflective substance, wherein the pellets and the reflective substance form the reflective covering, wherein the reflective covering is configured such that reflective properties of the marker are lost through a sterilization process.

* * * * *